United States Patent [19]

Saito et al.

[11] 4,295,556

[45] Oct. 20, 1981

[54] PASSENGER CONVEYOR

[75] Inventors: Cyuichi Saito; Katsuya Teranishi, both of Katsuta, Japan

[73] Assignee: Hitachi, Ltd., Tokyo, Japan

[21] Appl. No.: 32,756

[22] Filed: Apr. 24, 1979

[30] Foreign Application Priority Data

Apr. 24, 1978 [JP] Japan .................................. 53-47746

[51] Int. Cl.[3] .......................... B65G 15/00; B65G 9/14

[52] U.S. Cl. ...................................... 198/325; 198/331

[58] Field of Search ......................... 198/325, 331, 333

[56] References Cited

U.S. PATENT DOCUMENTS

| | | | |
|---|---|---|---|
| 1,956,154 | 4/1934 | Lindquist et al. | 198/325 |
| 2,033,308 | 3/1936 | Shonnard | 198/333 |
| 2,210,711 | 8/1940 | Dunlop | 198/325 |
| 3,049,213 | 8/1962 | Fabula | 198/331 |

*Primary Examiner*—Joseph E. Valenza
*Assistant Examiner*—Brian Bond
*Attorney, Agent, or Firm*—Craig and Antonelli

[57] ABSTRACT

A passenger conveyor has a plurality of steps each including a treadboard provided with a number of cleats and grooves defined therebetween, the cleats being adapted to mesh with teeth of a comb-like plate at each terminal of the conveyor, and a frame to which the treadboard is secured; handrails adapted to run in synchronism with the travel of the steps; handrail frames disposed beneath the handrails; and balustrade panels. The treadboard is formed of a corrugated stainless steel sheet and is reinforced by at least one reinforcement member attached to the underside of the treadboard. The handrail frame is formed by first and second members both made of stainless steel sheets and having U-shaped cross-sections. The first and second members are welded together in back-to-back relationship so that the open side of the first member is directed toward the handrail while the open side of the second member is directed toward the balustrade panel.

4 Claims, 10 Drawing Figures

PASSENGER CONVEYOR

BACKGROUND OF THE INVENTION

1. Field of the Invention

The present invention relates to a passenger conveyor such as an escalator or a moving pathway.

2. Description of the Prior Art

The passenger conveyors have been popularized as essential transportation service equipments in buildings. Recently, the use of the passenger conveyors has been extended to outdoor crowded areas, such as underground stations of subway, stations of elevated railroad and the like, to provide a part of city transportation network.

The passenger conveyors for such extended uses are required to operate under severe environmental conditions, as compared with passenger conveyors in conventional uses such as escalators of department stores. For instance, the passenger conveyors for such extended uses have to meet with various requirements particularly in respect of durability, such as corrosion-resistant property high enough to withstand the corrosive action of underground water, surface hardness sufficiently high to avoid damages caused by the contact of passengers. Thus, there is an increasing demand for passenger conveyors which fully meet with these requirements.

Typical passenger conveyor of the prior art is constituted by movable elements such as a plurality of steps connected in series in an endless manner to carry passengers thereon, handrails adapted to run in synchronization with the steps and so on, and stationary elements such as balustrade panels constituting balustrades, handrail frames, outer decks, inner decks disposed behind the balustrade panels and in opposite relationship to the outer decks, and so on.

The balustrades are each composed of a plurality of handrail frame sections connected smoothly and continuously in the longitudinal direction of the conveyor, such as substantially semicircular handrail frame sections, curvilinear handrail sections connected to the semicircular sections, and an inclined handrail section.

The handrail frames constituting the balustrades and the treadboards of the steps were conventionally made of extruded structural materials of an aluminum alloy. Thus, the conventional conveyors had shortcomings in respect of the durability and corrosion-resistant surface property.

More specifically, a literature "Corrosion-Resistant Alloys" issued in 1962 by Japan Metal Engineering Association contains an article concerning alkali-resistant properties of metals as shown in the table below:

| kinds of metal | corrosion rate (mg/dm$^2$/day) |
|---|---|
| aluminum | 25,000 |
| stainless steel | 1 |
| iron | 1 |

(5% caustic soda solution used)

It will be seen from above table that aluminum is corroded at a rate which is 25,000 times of those of stainless steel and iron. This raises quite a serious problem because concrete, which exhibits a high alkalinity, is usually laid in those areas where the passenger conveyors are installed and hence the bad influence of the alkalinity on the aluminum is unavoidable. This is also shown by the fact that most of already-constructed passenger conveyors installed in such areas have been corroded more or less. On the other hand, aluminum exhibits a hardness as low as 13 in Shore hardness scale and, therefore, is liable to be damaged by passenger's shoes and the like.

As a solution for these problems, it is conceivable to make handrail frames and treadboards from stainless steel which exhibits a hardness and corrosion resistance which are 2 times and 2500 times of those of aluminum, respectively.

It is to be pointed out, however, that stainless steel has been recognized as a material having extremely poor workability and formability in machining and plastic working, respectively, and for this reason, is not in use in any commercial scale.

SUMMARY OF THE INVENTION

It is, therefore, an object of the present invention to make it possible to use stainless steel as the material of the handrail frames and treadboards of passenger conveyors by employing handrail frames and treadboards of shapes with which they can be formed easily from stainless steel.

It is another object of the invention to solve various problems which would otherwise accompany the formation of treadboards of passenger conveyors from stainless steel.

So as to achieve the objects, the present invention provides an improved passenger conveyor in which the treadboard of each step is formed of a corrugated stainless steel sheet and is reinforced by at least one reinforcement member attached to the underside of the treadboard and a handrail frame is formed by first and second members both made of stainless steel sheets and having U-shaped cross-sections, the first and second members being welded together in back-to-back relationship so that the open side of the first member is directed toward the handrail while the open side of the second member is directed toward balustrade panels.

The above and other objects, features and advantages of the present invention will be made apparent by the following description with reference to the accompanying drawings.

DESCRIPTION OF PREFERRED EMBODIMENTS

Figure 1:
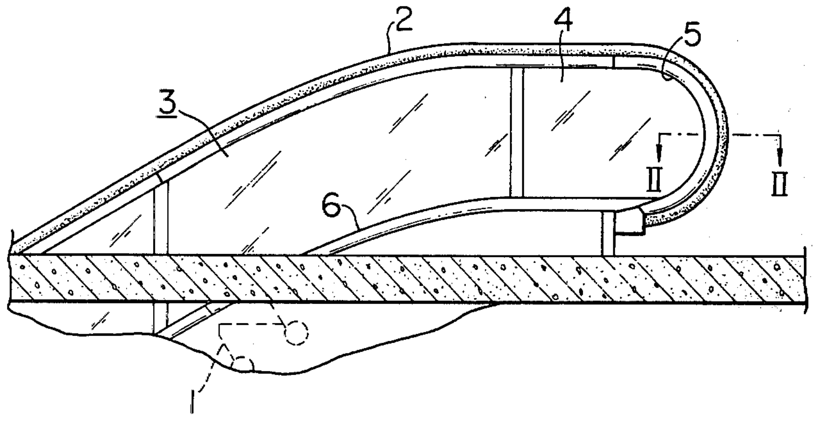
FIG. 1 is a side elevational view of an upper terminal section of a passenger conveyor.

Referring first to FIG. 1, a passenger conveyor has a plurality of steps 1 for carrying passengers. These steps 1 are connected in an endless fashion and are moved in the same manner as an endless belt. Each step 1 includes a treadboard having an upper surface provided with a number of cleats which are adapted to mesh with teeth of comb-like plates (not shown) which are disposed at the upper and lower terminals of the conveyor. The conveyor is also provided with a pair of handrails 2 which are adapted to be moved in synchronization with the steps 1. These steps 1 and handrails 2 constitute movable parts of the passenger conveyor. The passenger conveyor also includes stationary elements such as balustrade panels 4 forming balustrades 3, handrail frames 5, outer decks 6 and so forth.

Figure 2:
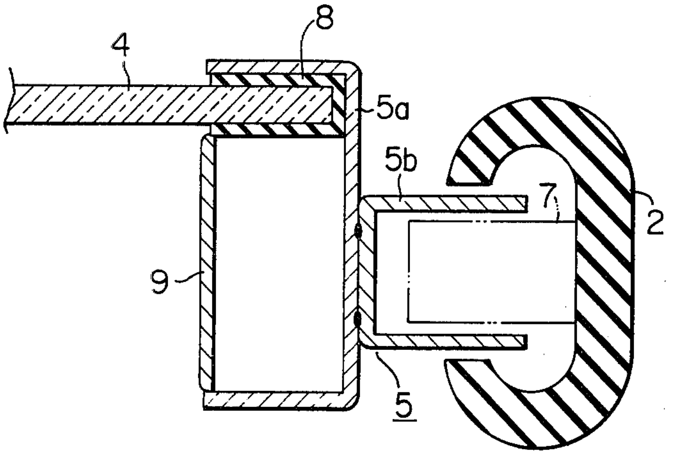
FIG. 2 is a sectional view taken along line II—II in FIG. 1, showing a handrail frame of stainless steel made according to an embodiment of the present invention.

As shown in detail in FIG. 2, each handrail frame 5 is constituted by a first member **5*a* made of a sheet of stainless steel and having substantially U-shaped cross-section with its opened side directed toward the bulstrade panel 4, and a second member 5*b* also made of a sheet of stainless steel and having a substantially U-shaped cross-section with its opened side directed toward the handrail 2. These first and second members are welded to each other in a back-to-back relation. It will be seen that the described construction of the handrail frame 5, consisting of two members 5*a*, 5*b* having simple cross-sections, permits an easy fabrication of the handrail of the passenger conveyor from stainless steel sheets. The welding of these two members in back-to-back relation can conveniently avoid the formation of gap between two members, which would otherwise be formed due to an error in the production of these members, particularly during the bending of these members at the upper and lower terminal portions. The opening in the first member 5*a* receives the end of a balustrade panel 4 and firmly supports the panel by means of a packing 8 interposed therebetween, while the opened space in the second member 5*b* accommodates and supports rollers 7 for guiding the handrail 2. In rectilineal sections, however, the rollers are substituted by a mere guide 7' as shown by chain lines. Further, the opening in the first member 5*a* is closed by a cover 9**.

Figure 3:
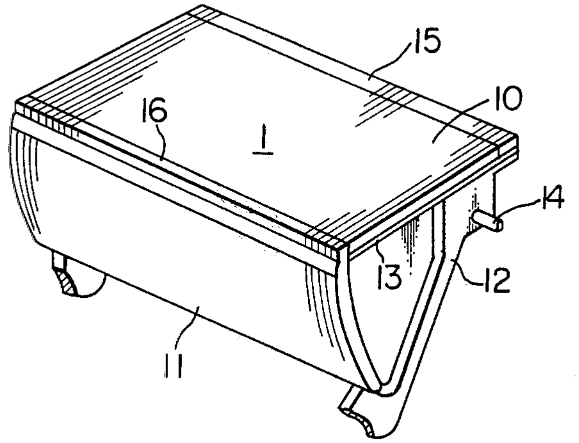
FIG. 3 is a perspective view of a step having a treadboard of stainless steel made according to the embodiment of the invention.

Referring now to FIG. 3, each step 1 includes a treadboard 10 formed by a corrugated stainless steel sheet, a riser 11, a frame 12 supporting the treadboard 10 and the riser 11 and a reinforcement plate 13 fixed to the underside of the treadboard 10. Comb-like end pieces 15 and 16 are provided at the leading and trailing ends of the treadboard 10 in such a manner as to close vacant spaces 17 formed under respective cleats of the treadboard. The comb-like pieces 15 and 16 may advantageously be made of a plastic of a color which would attract the passenger's attention to danger, e.g., yellow. Such colored comb-like end pieces 15, 16 act both as closures for closing the vacant spaces 17 and as marks of danger. A shaft 14 provided on each side of the frame 12 is to rotatably support a roller (not shown) for carrying and guiding the step 1.

Figure 4:
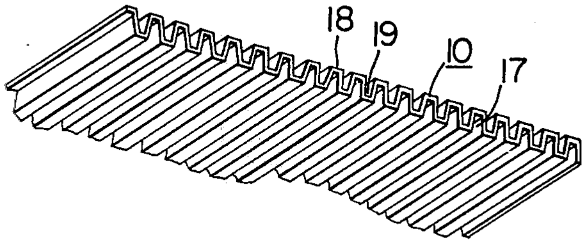
FIG. 4 is an enlarged perspective view of the treadboard.
Figure 5:
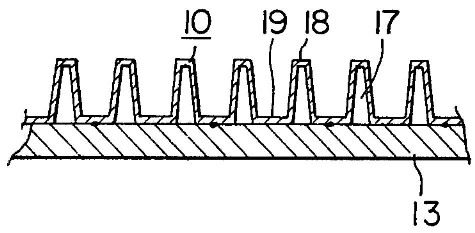
FIG. 5 shows a manner of connection between the treadboard and a reinforcement member.

Referring now to FIG. 4 which is an enlarged perspective view of the treadboard 10, the treadboard is formed by a corrugated stainless steel sheet and has a number of cleats 18 and grooves 19 defined between these cleats 18. In order to prevent the treadboard 10 from being crushed by a heavy load applied thereto, a reinforcing plate 13 is welded to the underside of the treadboard 10, as will be most clearly seen from FIG. 5. The treadboard 10 is detachably secured to the frame 12 through the reinforcing plate 13.

Figure 6:
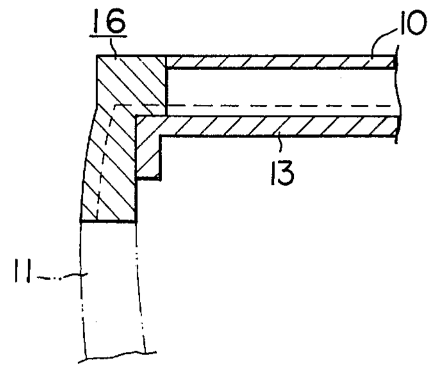
FIG. 6 is a side elevational sectional view of a part of the step and a comb-like end piece attached to the treadboard of the step.
Figure 7:
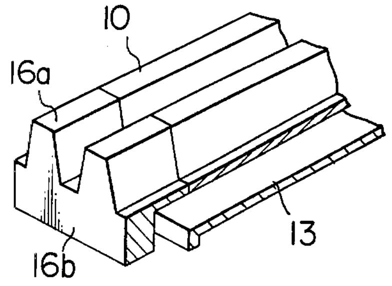
FIG. 7 is a perspective view of the portion of the step shown in FIG. 6.

As will be seen in FIGS. 6 and 7, the vacant spaces 17 formed under the cleats 18 are closed at one end by the comb-like end piece 16, as stated before. The comb-like end piece 16 has cleat sections **16*a* and a frame section 16*b* which is fixed to the reinforcing plate 13. Although only the trailing end of the treadboard 10 and the end piece 16 are shown in FIGS. 6 and 7, it will be understood that the vacant spaces 17 are closed also at the leading end of the treadboard 10 by the comb-like end piece 15**.

Figure 8:
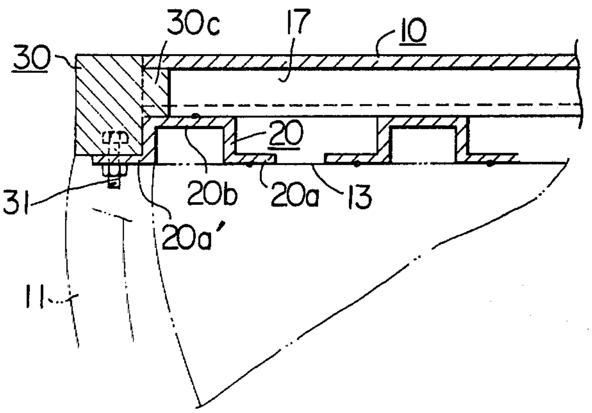
FIG. 8 is a side elevational sectional view of another embodiment of a step and reinforcement members.
Figure 9:
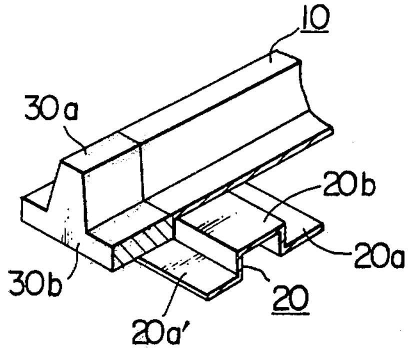
FIG. 9 is a perspective view of the portion of the step shown in FIG. 8.
Figure 10:
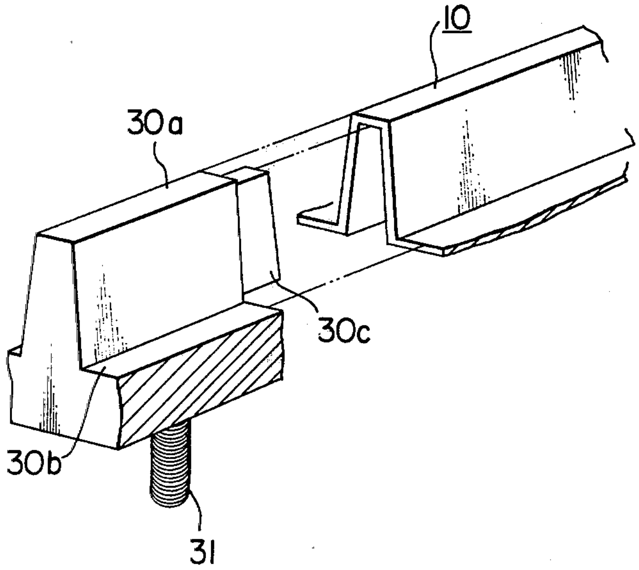
FIG. 10 illustrates the relationship between a comb-like end piece and a vacancy in the treadboard.

FIGS. 8 to 10 show another embodiment of the invention directed to different forms of reinforcement plate and comb-like end pieces. Namely, three hat-shaped reinforcement girders 20 are disposed under the treadboard 10 at the leading and trailing ends and the central section thereof, respectively. Due to the use of these reinforcement girders 20, the mechanical strength of the treadboard is considerably increased with an advantageous result that it becomes possible to reduce the thickness of the sheet metal and, hence, the weight of the treadboard. Each reinforcement girder 20 is hat-shaped in cross-section and has flat side flanges **20*a* and 20*a*' connected by an intermediate horizontal top web 20*b* and is welded at the side flanges 20*a* and 20*a*' and at the intermediate top web 20*b* to the frame 12 and to the treadboard 10**, respectively.

On the other hand, the modified comb-like end piece is denoted by 30 and has a cleat sections **30*a*, a frame section 30*b* and projections 30*c* which are fitted into the vacant spaces 17 under the cleats of the treadboard 10. Since the projections 30*c* are received in the vacant spaces 17, the comb-like end piece 30 can conveniently be prevented from being displaced relative to the treadboard 10. The comb-like end piece 30 is so shaped as to rest on the horizontal flange 20*a*' of the reinforcement girder 20 and is fixed to the latter by means of bolts 31. A similar comb-like end pieces (not shown) can be attached also to the leading end of the treadboard 10**.

In the described embodiment, the handrail frame is constituted by U-cross-sectioned members welded to each other in a back-to-back relation. The U-shaped cross-section, however, can alternatively be C-shaped cross-section. Thus, the term "U-shaped" or "U-cross-sectioned" is used in the specification to broadly mean various channel-like form including U-like shape and C-like shape.

The present invention heretofore described offers the following advantage. Namely, partly because the treadboard is constituted by a corrugated sheet metal and partly because the handrail frame is constituted by a combination of two frame members having U-shaped cross-sections which open, respectively, toward the handrail and toward the bulstrade panel, it becomes possible to use stainless steel sheets as the materials of passenger conveyors and hence it becomes possible to produce a highly durable passenger conveyor.

What is claimed is:

1. A passenger conveyor comprising a plurality of steps each including a treadboard provided with a number of cleats and grooves defined therebetween, the cleats being adapted to mesh with teeth of a comb-like plate provided at each terminal of said conveyor, and a frame to which said treadboard is secured; handrails adapted to run in synchronism with the travel of said steps; handrail frames disposed beneath said handrails; and balustrade panels, wherein said treadboard is formed of a corrugated stainless steel sheet and is reinforced by at least one reinforcement member attached to the underside of said treadboard, comb-like end pieces are attached to the leading and trailing ends of said treadboard, each end piece including a plurality of projections extending and fitted into the vacant spaces formed under said cleats of said treadboard, cleat sections extending substantially in alignment with the cleats of said treadboard, and a frame section secured to said reinforcement member, wherein said handrail frame is formed by first and second members both made of stainless steel sheets and having U-shaped cross-sections, said first and second members being welded together in back-to-back relationship so that the open side of said first member is directed toward said handrail while the open side of said second member is directed toward said balustrade panels, and wherein said comb-like end pieces are made of a colored plastic material to mark dangerous zones of the step.

2. A passenger conveyor comprising a plurality of steps each including a treadboard provided with a number of cleats and grooves defined therebetween, the cleats being adapted to mesh with teeth of a comb-like plate provided at each terminal of said conveyor, and a frame to which said treadboard is secured; handrails adapted to run in synchronism with the travel of said steps; handrail frames disposed beneath said handrails; and balustrade panels, wherein said treadboard is formed of a corrugated stainless steel sheet and is reinforced by at least one reinforcement member attached to the underside of said treadboard, comb-like end pieces are attached to the leading and trailing end of said treadboard, each end piece including a plurality of projections extending and fitted into the vacant spaces formed under said cleats of said treadboard, cleat sections extending substantially in alignment with the cleats of said treadboard, and a frame section secured to said reinforcement member, wherein said handrail frame is formed by first and second members both made of stainless steel sheets and having U-shaped cross-sections, said first and second members being welded together in back-to-back relationship so that the open side of said first member is directed toward said handrail while the open side of said second member is directed toward said balustrade panels, and wherein said reinforcement member has a hat-shaped cross-section defined by laterally spaced flat side flanges and an intermediate flat top web interconnecting said side flanges, said reinforcement member being welded at said side flat flanges and at said intermediate top web to said frame of said step and to said treadboard, respectively.

3. A passenger conveyor as defined in claim 1, wherein three hat-shaped reinforcement members are disposed under said treadboard at the leading end, the central portion and the trailing end of said treadboard, respectively.

4. A passenger conveyor as defined in claim 3, wherein said comb-like end pieces close the vacant spaces defined under respective cleats of said treadboard and are respectively secured to one of the side flanges of the leading end reinforcement member and to one of the side flanges of the trailing end reinforcement member.

* * * * *